US012541772B2

(12) United States Patent
Ward et al.

(10) Patent No.: US 12,541,772 B2
(45) Date of Patent: *Feb. 3, 2026

(54) SELF-DISCLOSED IDENTITY ON A NETWORK

(71) Applicant: Wells Fargo Bank, N.A., San Francisco, CA (US)

(72) Inventors: Marc Ward, Livermore, CA (US); Thomas J. Gilheany, San Jose, CA (US); Parul Ghosh, Bangalore (IN); Shahriar Zand-Biglari, Phoenix, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,680

(22) Filed: Jul. 11, 2024

(65) Prior Publication Data
US 2024/0362662 A1    Oct. 31, 2024

Related U.S. Application Data

(63) Continuation of application No. 18/153,189, filed on Jan. 11, 2023, now Pat. No. 12,056,731.

(51) Int. Cl.
*G06Q 30/00*     (2023.01)
*G06Q 30/0207*   (2023.01)
(Continued)

(52) U.S. Cl.
CPC ..... *G06Q 30/0216* (2013.01); *H04L 63/0861* (2013.01); *H04L 67/306* (2013.01)

(58) Field of Classification Search
CPC ............ G06Q 30/0216; H04L 63/0861; H04L 67/306
See application file for complete search history.

(56) References Cited

U.S. PATENT DOCUMENTS

| 7,406,594 B2 | 7/2008 | Taruguchi |
| 7,624,421 B2 | 11/2009 | Ozzie et al. |

(Continued)

FOREIGN PATENT DOCUMENTS

| CN | 104796265 A | 7/2015 |
| CN | 104901956 A | 9/2015 |

(Continued)

OTHER PUBLICATIONS

"Blockchain-Based Identity Management System and Self-Sovereign Identity Ecosystem: A Comprehensive Survey". IEEE. 2022. (Year: 2022).*

(Continued)

*Primary Examiner* — Maria V Vanderhorst
(74) *Attorney, Agent, or Firm* — Shumaker & Sieffert, P.A.

(57) ABSTRACT

Techniques described herein include techniques for communicating information about the social behavior of users and transactions performed by users on a computer network. In one example, this disclosure describes a method that includes receiving information about identity disclosure activities performed by each of a plurality of users on the network; determining that the information about identity disclosure activities includes information consistent with a prior identity disclosure activity performed by a first user having a first user status on the network; increasing the first user status; determining that the information about identity disclosure activities includes information that is not consistent with a prior identity disclosure activity performed by a second user having a second user status on the network; and decreasing the second user status.

20 Claims, 4 Drawing Sheets

(51) Int. Cl.
   *H04L 9/40*      (2022.01)
   *H04L 67/306*    (2022.01)
   *G05B 19/418*    (2006.01)

(56) References Cited

U.S. PATENT DOCUMENTS

| | | |
|---|---|---|
| 8,914,848 B2 | 12/2014 | Castro et al. |
| 10,158,489 B2 | 12/2018 | Shastri et al. |
| 10,367,817 B2 | 7/2019 | Ligatti |
| 10,387,634 B1 | 8/2019 | Lindell et al. |
| 10,447,694 B2 | 10/2019 | Sun et al. |
| 10,489,759 B2 | 11/2019 | Hessler |
| 10,594,697 B2 | 3/2020 | Copsey |
| 10,659,453 B2 | 5/2020 | Huang |
| 11,025,439 B2 | 6/2021 | Theodore et al. |
| 11,030,331 B2 | 6/2021 | Schvey et al. |
| 11,153,303 B2 | 10/2021 | Scruby |
| 11,163,862 B2 | 11/2021 | Barillari et al. |
| 11,165,771 B2 | 11/2021 | Zavesky et al. |
| 11,189,294 B2 | 11/2021 | Sohn |
| 11,290,324 B2 | 3/2022 | Smith et al. |
| 2008/0148366 A1 | 6/2008 | Wahl |
| 2012/0278155 A1 | 11/2012 | Faith |
| 2016/0219036 A1 | 7/2016 | Devkar et al. |
| 2019/0034605 A1 | 1/2019 | Wang et al. |
| 2019/0068382 A1 | 2/2019 | Theodore et al. |
| 2019/0289013 A1* | 9/2019 | Makmel .............. H04L 63/0876 |
| 2020/0252205 A1 | 8/2020 | Padmanabhan |
| 2020/0404019 A1 | 12/2020 | Drake |
| 2021/0084063 A1* | 3/2021 | Triantafillos .......... H04L 67/535 |
| 2021/0406893 A1 | 12/2021 | Calvert et al. |
| 2022/0004617 A1 | 1/2022 | Irwin, III |
| 2022/0086134 A1 | 3/2022 | Xie |
| 2022/0131844 A1* | 4/2022 | Sherlock .............. H04L 63/105 |
| 2023/0186281 A1* | 6/2023 | Todasco ........... G06Q 20/38215 705/64 |

FOREIGN PATENT DOCUMENTS

| | | |
|---|---|---|
| KR | 20200032086 A | 3/2020 |
| WO | 2019205389 A1 | 10/2019 |

OTHER PUBLICATIONS

"Comparative Analysis of Decentralized Identity Approaches". IEEE. 2022. (Year: 2022).*

"A Decentralised Digital Identity Architecture". arXiv.com. 2019. (Year: 2019).*

Ahmed et al., "Blockchain-Based Identity Management System and Self-Sovereign Identity Ecosystem: A Comprehensive Survey", vol. 10, IEEE, Nov. 3, 2022, 46 pp.

Hinojos et al., "Face Recognition Using Distributed, Mobile Computing", 2014 IEEE International Conference on Acoustics, Speech and Signal Processing, IEEE, May 4, 2014, pp. 2179-2183, URL: https://web.nmsu.edu/~pdeleon/Research/Publications/ICASSP_2014_2.pdf.

Prosecution History from U.S. Appl. No. 18/153,189, dated Aug. 17, 2023 through Jul. 9, 2024, 47 pp.

U.S. Appl. No. 17/827,387, filed May 27, 2022, naming inventor Ward.

U.S. Appl. No. 18/153,189, filed Jan. 11, 2023, naming inventors Ward et al.

U.S. Appl. No. 18/333,836, filed Jun. 13, 2023, naming inventors Ward et al.

U.S. Appl. No. 63/256,495, filed Oct. 15, 2021, naming inventor Ward.

Office Action from U.S. Appl. No. 18/333,836 dated Aug. 6, 2025, 11 pp.

Response to Office Action dated Aug. 6, 2025 from U.S. Appl. No. 18/333,836, filed Nov. 5, 2025, 9 pp.

* cited by examiner

SELF-DISCLOSED IDENTITY ON A NETWORK

CROSS REFERENCE

This application is a continuation application of and claims priority to U.S. patent application Ser. No. 18/153,189 filed on Jan. 11, 2023, which is hereby incorporated by reference herein in its entirety.

TECHNICAL FIELD

This disclosure relates to computer networks, and more specifically, to techniques for fostering a vibrant and healthy network of users.

BACKGROUND

By some measures, the value of a computer network bears a positive relationship to the number of users interconnected by the network. The value of the network is also enhanced by the knowledge each individual adds to the store of knowledge maintained by the network.

However, in networks where users are able to maintain multiple identities, the relationship between users and network value is not as strong, since the number of true users tends to be overstated and difficult to precisely quantify. On networks where users maintain multiple identities, the value of the network also tends to be overstated when calculated based on an identity count, because one user that maintains two identities on the network often contributes less value to the network than two users that each maintain only one identity on the network.

SUMMARY

Techniques described herein include techniques for communicating information about the social behavior of users and transactions performed by users on a computer network. In some examples, techniques described involve establishing processes for achieving collective identity confidence. Such processes may be designed to identify fraudulent actors and/or to identify actors that attempt to maintain more than one identity on a network. In some examples, such processes involve providing incentives to users, where the incentives not only encourage use of the network, but also encourage users to maintain one real identity when interacting with others on the network.

Techniques described herein include various identity disclosure activities, including a mutual self-disclosed identity process. In such a process, two individuals authorized to use the network interact to verify each other's identity. Since this process is mutual, it may leverage the personal knowledge and familiarity that each of the individuals has about the other individual. In some cases, data derived from identity disclosure activities are stored for later use and/or analysis. Such data may also be stored on a consensus network to help ensure that the data is not changed over time and can be verified by the public. In some examples, users of a network are incentivized to engage in the identity disclosure activities, where the incentives may take the form of users receiving a share of transaction fees incurred on the network.

An administrator overseeing and/or maintaining the network may have access to a significant amount of information about commercial, social, and/or operational transactions taking place on the network. Using this access, the administrator may create a knowledge graph based on the information derived from the transactions, and the knowledge graph may be used as the basis for making recommendations to network actors. Recommendations may involve proposed activities, purchases, and/or interactions.

In some examples, this disclosure describes operations performed by a computing system in accordance with one or more aspects of this disclosure. In one specific example, this disclosure describes a method comprising receiving, by a computing system and over a network, information about identity disclosure activities performed by each of a plurality of users on the network; determining, by the computing system, that the information about identity disclosure activities includes information consistent with a prior identity disclosure activity performed by a first user having a first user status on the network; increasing, by the computing system, the first user status based on determining that the information about identity disclosure activities includes information consistent with the prior identity disclosure activity performed by the first user; determining, by the computing system, that the information about identity disclosure activities includes information that is not consistent with a prior identity disclosure activity performed by a second user having a second user status on the network; and decreasing, by the computing system, the second user status based on determining that the information about identity disclosure activities includes information that is not consistent with the prior identity disclosure activity performed by the second user.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
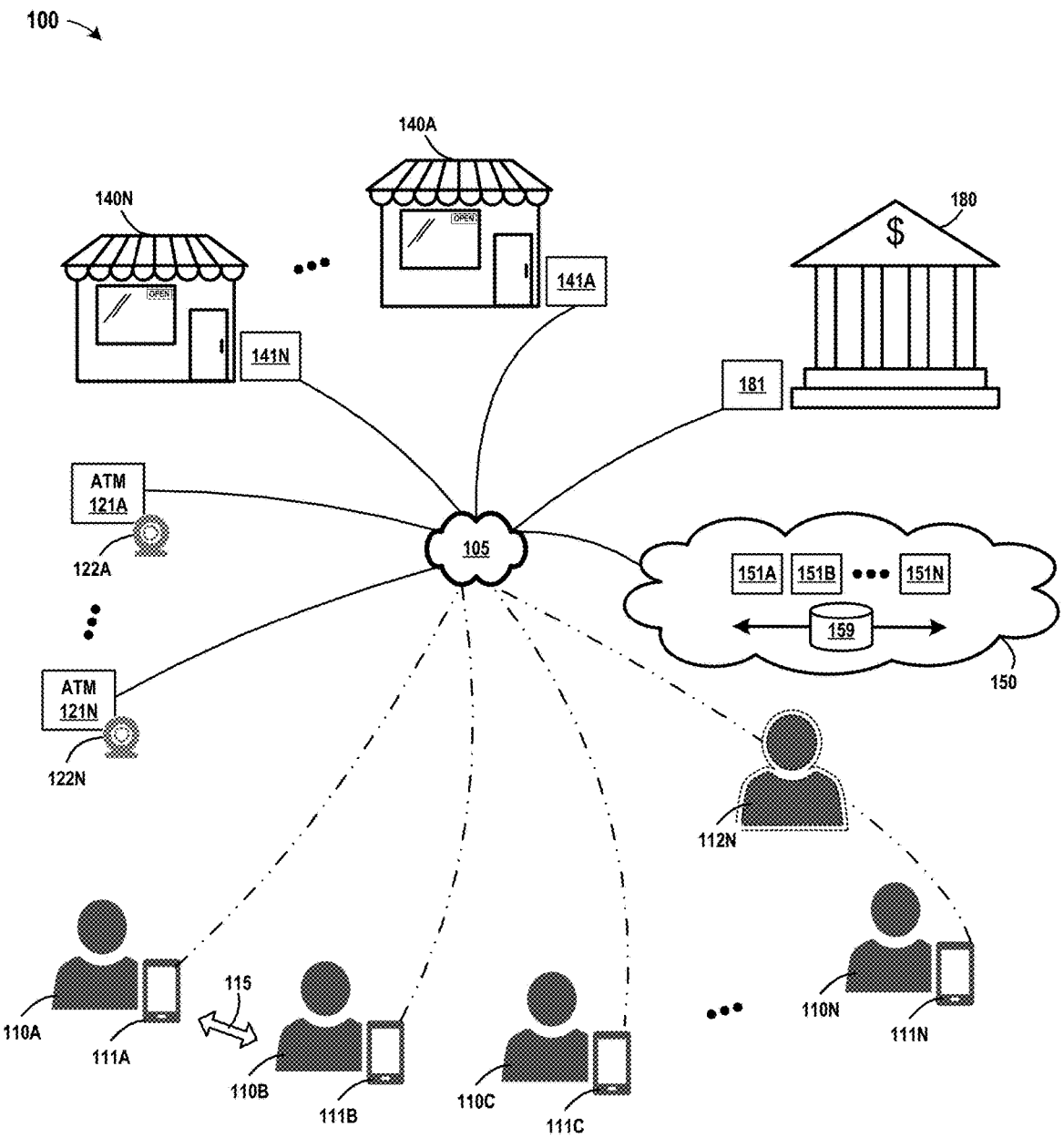
FIG. 1 is a conceptual diagram illustrating an example system that maintains and enhances network value by incentivizing certain user behaviors associated with the network, in accordance with one or more aspects of the present disclosure.

FIG. 1 is a conceptual diagram illustrating an example system that maintains and enhances network value by incentivizing certain user behaviors associated with the network, in accordance with one or more aspects of the present disclosure. In FIG. 1, transaction network 100 includes representations of a number of users, entities, and systems capable of communicating over network 105. For example, illustrated in transaction network 100 are users 110A through 110N (collectively, "users 110," representing any number of users), merchants 140A through 140N (collectively, "merchants 140," representing any number of merchants), and network administrator 180. Also illustrated in FIG. 1 are field systems 121A through 121N (collectively, "field systems 121," representing any number of field systems 121), and consensus network 150.

Each of users 110 may operate and/or possess one or more computing devices 111. For example, as illustrated in FIG. 1, user 110A operates computing device 111A, user 110B operates computing device 111B, user 110C operates computing device 111C, and in general, user 110N operates computing device 111N. Users 110 may communicate and/or interact with other users 110 and merchants 140 (e.g., over network 105) using such computing devices 111. Network 105 serves as a communications infrastructure or platform on which transaction network 100 operates. Network 105 may be or may include or represent any public or private communications network or other network, including the internet.

Often, computing devices 111 may be mobile communications devices, such as smartphones. However, computing devices 111 may be implemented through any suitable computing system including any mobile, non-mobile, wearable, and/or non-wearable computing device, which may be a mobile phone or tablet, or a laptop or desktop computing device. In general, devices 111 may take any appropriate form, which may include a computerized watch, a computerized glove or gloves, a personal digital assistant, a virtual assistant, a gaming system, a media player, an e-book reader, a television or television platform, a bicycle, automobile, or navigation, information and/or entertainment system, or any other type of wearable, non-wearable, mobile, or non-mobile computing device that may perform operations in accordance with one or more aspects of the present disclosure.

Each of merchants 140 may be a physical, virtual, and/or online retailer or other commercial entity that provides products or services to users 110. For example, any of merchants 140 may be a grocery store, gas station, department store, specialty or other retailer, drug store, restaurant, coffee shop, medical clinic, legal or accounting services provider, transportation services provider, or any other commercial entity that maintains a physical presence. Alternatively, or in addition, any of merchants 140 may be an online or virtual commercial entity that provides products or services corresponding to or similar to those provided by a physical grocery store, gas station, department store, specialty or other retailer, drug store, restaurant, coffee shop, medical clinic, legal or accounting services provider, transportation services provider, or other commercial entity.

Merchants 140 may operate or control various computing systems, depicted generally in FIG. 1 as merchant computing systems 141A through 141N (collectively, "merchant computing systems 141"). Specifically, in FIG. 1, merchant 140A operates or controls merchant computing system 141A, and merchant 140N operates or controls merchant computing system 141N. Each of merchant computing systems 141 perform operations relating to providing goods or services to one or more users 110 over network 105 or through physical delivery of a product sold by a corresponding merchant 140. For example, each of merchant computing systems 141 may perform operations that include manifesting a web presence, taking orders, providing product support, and/or communicating with customers.

Each of merchant computing systems 141 may be implemented as any suitable computing system or collection of computing systems, including one or more server computers, workstations, mainframes, appliances, cloud computing systems, and/or other computing devices that may be capable of performing operations and/or functions described in accordance with one or more aspects of the present disclosure. In some examples, such systems may represent or be implemented through one or more virtualized compute instances (e.g., virtual machines, containers) of a data center, cloud computing system, server farm, and/or server cluster.

Network administrator 180 may be a public or private entity that administers operations on transaction network 100, monitors and maintains aspects of transaction network 100, and/or implements policies on transaction network 100 that tend to benefit users 110 and/or merchants 140. In some examples, network administrator 180 may be a bank or other financial institution, but other private or public entities could serve as network administrator 180. However, a bank or other financial institution may be an appropriate entity to serve as network administrator 180, since at least some banks and/or financial institutions tend to be well positioned (commercially, organizationally, and legally) to process transactions for merchants 140 and maintain financial accounts for users 110 in a way that facilitates operations on transaction network 100.

Network administrator 180 may operate and control a collection of computing systems for use in facilitating various network operations described herein. Such computing systems are collectively represented in FIG. 1 as network management computing system 181. Network management computing system 181 may be implemented as any suitable computing system or collection of computing systems, including one or more server computers, workstations, mainframes, appliances, cloud computing systems, and/or other computing devices that may be capable of performing operations and/or functions described in accordance with one or more aspects of the present disclosure. In some examples, such systems may represent or be implemented through one or more virtualized compute instances (e.g., virtual machines, containers) of a data center, cloud computing system, server farm, and/or server cluster.

Field systems 121 represent various physical machines or devices deployed by network administrator 180 throughout a geographic region. Often, such field systems 121 are automated teller machines ("ATMs") or kiosks that serve as automated points of presence for network administrator 180. Accordingly, in FIG. 1, field systems 121 are labeled as "ATMs," but such systems may take the form of other existing kiosks or points of presence that may be deployed within a region. Typically, such ATMs or kiosks have one or more sensors 122 (illustrated in FIG. 1 as sensor 122A associated with field system 121A, and sensor 122N associated with field system 121N). These sensors 122 may be any appropriate devices or systems, which may include cameras, microphones, biometric sensors, or other types of sensors. Each of field systems 121 may provide conventional services provided by an automated teller machine (e.g., dispensing cash, processing banking transactions). Alternatively, or in addition, each of field systems 121 may also perform other operations as described herein, particularly those relating to enabling one or more users 110 to perform identity disclosure activities (e.g., a self-disclosure process) to maintain user status on transaction network 100. Such a process may take advantage of or utilize various sensors 122 that may be incorporated into each of field systems 121. Although described herein primarily as ATMs, field systems 121 should be understood to encompass any type of physical system or physical point of presence, automated or otherwise.

Consensus network 150 includes a plurality of nodes, including node 151A through 151N (collectively "nodes 151," and representing any number of nodes). Consensus network 150 may include one or more distributed ledgers, including distributed ledger 159, which may be implemented as a data store included in multiple (or all) nodes 151 within consensus network 150. In general, each node 151 within consensus network 150 (or a significant fraction of nodes 151) includes a copy (or at least a partial copy) of distributed ledger 159 maintained by consensus network 150.

Typically, consensus network 150 is implemented as a network of computing devices (e.g., "nodes 151") that collectively maintain one or more distributed ledgers 159. Nodes 151 included within consensus network 150 may each represent any computing device capable of adhering to a consensus protocol and/or performing operations corresponding to one or more smart contracts. One or more consensus networks 150 may, for instance, represent an Ethereum network of Ethereum virtual machines (EVMs), also known as an Ethereum blockchain platform, executing on hardware computing devices. In one example, consensus network 150 might be implemented as a proof of stake network, where network administrator 180 owns all the delegates and serves as a trusted source such that network administrator 180 settles all the blocks (e.g., through network management computing system 181). Consensus network 150 may be implemented in any appropriate manner, whether now known or hereinafter developed.

Distributed ledger 159 included within consensus network 150 may represent one or more shared transactional databases or data stores that include a plurality of blocks, each block (other than the root) referencing at least one block created at an earlier time, each block bundling one or more transactions registered within distributed ledger 159, and each block cryptographically secured. Consensus network 150 may receive transactions from transaction senders (e.g., computing devices external or internal to consensus network 150, such as network management computing system 181 in FIG. 1) that invoke functionality of distributed ledger 159 (or of a smart contract) to modify distributed ledger 159 stored within and maintained by consensus network 150. Consensus network 150 may use distributed ledger 159 for verification. Each block of distributed ledger 159 may contain a hash pointer as a link to a previous block, a timestamp, and the transaction data for the transactions. In a blockchain implementation, and by design, distributed ledger 159 is inherently resistant to modification of previously-stored transaction data. Functionally, distributed ledger 159 serves as a ledger, distributed across many nodes of a consensus network, that can record transactions (and other information, generally) between parties efficiently and in a verifiable and permanent way. Since distributed ledger 159 is a distributed ledger, each of nodes 151 within consensus network 150 (or at least a significant fraction of nodes 151) store a copy of distributed ledger 159.

For ease of illustration, only one consensus network 150 is illustrated in FIG. 1, and within consensus network 150, one distributed ledger 159 is illustrated. However, multiple consensus networks 150 may be included within implementations corresponding to that illustrated in FIG. 1, and multiple distributed ledgers 159 might be included or implemented by one or more consensus networks 150 in a manner consistent with the techniques described herein. For example, consensus network 150 may manage multiple distributed ledgers 159. Further, each of distributed ledgers 159 might be a private distributed ledger or a public distributed ledger.

The present disclosure describes a system or social network (i.e., transaction network 100) that enables knowledge to be shared amongst verified human members of the network. In transaction network 100, users 110 occasionally or periodically engage in a process of "disclosing" or "redisclosing" themselves. During such a process, network management computing system 181, operating on behalf of network administrator 180, collects and stores information about each of users 110. Network management computing system 181 establishes, based on the information, a unique self-disclosed identity (SDI) for each of users 110. Using the SDI, entities on transaction network 100 (e.g., network administrator 180 or merchants 140) can reaffirm confidence that each of users 110 performing actions on transaction network 100 is accurately identified.

The ability to accurately identify users 110 enables other entities and/or users on transaction network 100 to hold counterparties liable for contracts entered. In addition, an ability to uniquely and accurately identify users 110 also enables a network to determine the actual number of users 110 that use the network for communications, transactions, or other purposes.

In some examples, transaction network 100 may take the form of a distributed self-reinforcing network in which users 110 are incentivized to conduct distributed network reinforcing activities by performing identity disclosure activities and/or authenticating themselves to other users 110 as they go about their daily lives. As users 110 join transaction network 100, users 110 and other network actors work together to root out fraudsters that may seek to maintain multiple identities or otherwise perpetrate fraud. Such an arrangement enables network mathematics and network synergies (e.g., derived from a large number of users) to engage, resulting in significant benefits to anyone taking part in or having an ownership stake in transaction network 100. Processes described herein may enable users 110 to effectively transport their identity through time in a trusted manner from birth until death.

In some examples, transaction network 100 may operate based on a "ringed-layered" approach to identity management. In such an approach, users 110 are incentivized to self-disclose their identity to network administrator 180 (e.g., through network management computing system 181). The incentive for users 110 to engage in such a self-disclosure process to network administrator 180 may be a commitment (e.g., by network administrator 180) to compensate users 110 for such self-disclosure and/or for maintaining membership status on transaction network 100. For example, network administrator 180 may collect transaction fees for transactions taking place on transaction network 100, and the network administrator 180 may agree to compensate users 110 by distributing to each user 110 a share of those transaction fees. In some examples, such compensation may be structured as a yield paid to users 110 based on users' membership status and/or membership tenure on transaction network 100. Compensation may take any appropriate form, including through distribution of a finite cryptocurrency.

Accordingly, each of users 110 may be expected (or motivated) to maintain their identity (SDI) and/or membership status. Over time, if a user takes no actions to maintain or authenticate themselves, then the yield that would otherwise be distributed to that user from network administrator 180 (i.e., based on a promise to pay a share of transaction fees) may be reduced after a short period of time (e.g., removed from the user's wallet) and may eventually progress to not being distributed at all. Eventually, if no self-disclosed authentication takes place for a given user 110, network administrator 180 might conduct a death investigation to determine if that user 110 is deceased (which may necessitate adjudicating disposition of that user's assets according to law).

A human identity can be defined based on a biometric signature of a given user 110. Such a signature may take the form of a brain/blood/heart combination. In such a combination, "brain" information might correspond to a video of an identifiable user 110, "blood" information might correspond to information derived from a DNA sample taken from the user, and "heart" information might correspond to a signature of information derived from that user's heart vibrations. A user's biometric signature may take other forms, of course, and may be based on other types of biometric information. For example, each user 110 has various vibrations and speaking patterns, and unique fingerprints and retina patterns.

There are many potential methods through which a user 110 may perform an identity disclosure activity and thereby maintain an identity. For example, users 110 can disclose or redisclose their identity to a human agent of network administrator 180, or to a network member that performs such verifications as a service. Or users 110 may interact with one or more field systems 121. In another example, users 110 may engage in transactions (e.g., purchases from any of merchants 140) in which their identity is reaffirmed. And in yet another example, users 110 can engage in a mutual self-disclosure process with another user 110.

To perform a mutual self-disclosure process with another user, the users may each make a disclosure to the other user by being in the same physical location, and by using their computing devices 111 to exchange information. For example, if user 110A and users 110B were to engage in such a process, user 110A may place his or her thumb on computing device 111B (possessed by user 110B) or computing device 111B may capture a voiceprint, picture, or video of user 110A. User 110B may verify that the thumbprint, voiceprint, picture, and/or video is derived from user 110A, and may cause computing device 111B to send a certification of that verification (along with the collected information) over network 105 to network management computing system 181 for processing. Correspondingly, user 110B may place his or her thumb on computing device 111A (possessed by user 110A) or computing device 111A may capture a voiceprint, picture, or video of user 110B. User 110A may verify that the thumbprint, voiceprint, picture, and/or video is derived from user 110B, and may cause computing device 111A to send a certification of that verification (along with the collected information about user 110B) over network 105 to network management computing system 181 for processing.

As described herein, each of users 110 has one self-disclosed identity ("SDI"). In some examples, an SDI is created based on a hash of data generated from biometric and other data. A user's identity or SDI can be used to identify and/or verify the identity of that same user during encounters or interactions on the network. Network management computing system 181 may verify identity of the user by applying an algorithm trained to identify users based on the collected biometric and other information (e.g., received over network 105). In some examples, a decision fusion algorithm may be used to determine the confidence that the user is who the user says he or she is, and that the user's identity is tied to one individual.

Although users 110 generally have one identity, users may also establish "artificial identities," each of which may be considered an extension of a user's true identity (e.g., see artificial identity 112N illustrated as an extension of the identity of user 110N in FIG. 1). Artificial identities may contain aspects of the user's underlying identity or SDI and may also contain information about activities that the user authorized the artificial identity to conduct. In some cases, artificial entities are entities created to perform transactions on transaction network 100 on behalf of the user 110 that created the artificial identity, thereby providing any of users 110 with pseudo-anonymity. The network status of the artificial identity may be based on the network status of the underlying user 100 or SDI. Accordingly, trust given to artificial identity 112N operating on the network may correspond to or be derived from the trust given to user 110N on the network. Such an arrangement pushes the responsibility of identity management down to each of users 110 and gives users 110 the ability to self-determine the amount of risk they accept pertaining to their activities on transaction network 100. Users 110 are incentivized to monitor the activity of their artificial identities 112, since artificial identities that act on behalf of a user can affect that user's status on the network.

In some cases, network administrator 180 may recommend transactions be performed within transaction network 100. For example, network management computing system 181, operating on behalf of network administrator 180, collects information based on activity of users 110 on transaction network 100. Network management computing system 181 stores such information in a knowledge graph. After sufficient information has been collected in the knowledge graph, network management computing system 181 analyzes the knowledge graph to identify links between people, places, things, products, services, and entities. In some examples, network management computing system 181 generates, based on the knowledge graph, recommendations to users 110 involving proposed connections, transactions, product purchases, and service offerings, and the like. Such recommendations may be generated by a neural network trained to identify recommendations that have a high probability of being acted upon by users 110 (or artificial identities 112).

Network management computing system 181 may deploy such recommendations within transaction network 100 (e.g., as advertisements or recommendations), and users 110 (or artificial identities 112) may act on such recommendations, generating transaction and/or recommendation fees for the benefit of network administrator 180. In some respects, such recommendations may tend to enhance the activity and usefulness of transaction network 100, while also generating additional transaction fees (which could be distributed to users 110).

Techniques described herein may provide certain technical advantages. For instance, by encouraging or requiring occasional or periodic self-disclosure, transaction network 100 (or users 110 on transaction network 100) may root out fraudulent users 110 and discourage other users 110 from attempting to maintain more than one identity. In addition, fraud detection may be more efficient and accurate, since incentivized activities undertaken by users 110 will tend to expose fraud, and make perpetrating fraud more difficult and less productive. In addition, users 110 may be motivated to collectively eradicate fraud from transaction network 100, and merchants 140 may be relieved of at least some responsibility for identifying and/or addressing fraud.

Further, by establishing network status classifications for users 110, including enabling users 110 to increase their status through incentivized actions, users 110 will tend to naturally work together to maintain the health of transaction network 100. As transaction network 100 maintains or increases its health, transaction network 100 becomes more attractive to external users that do not already participate in or have a stake in transaction network 100. That attractiveness encourages those external users to join and/or participate in transaction network 100, thereby increasing the value of the network and supplying additional users 110 that are incentivized to maintain and increase the health transaction network 100.

Figure 2:
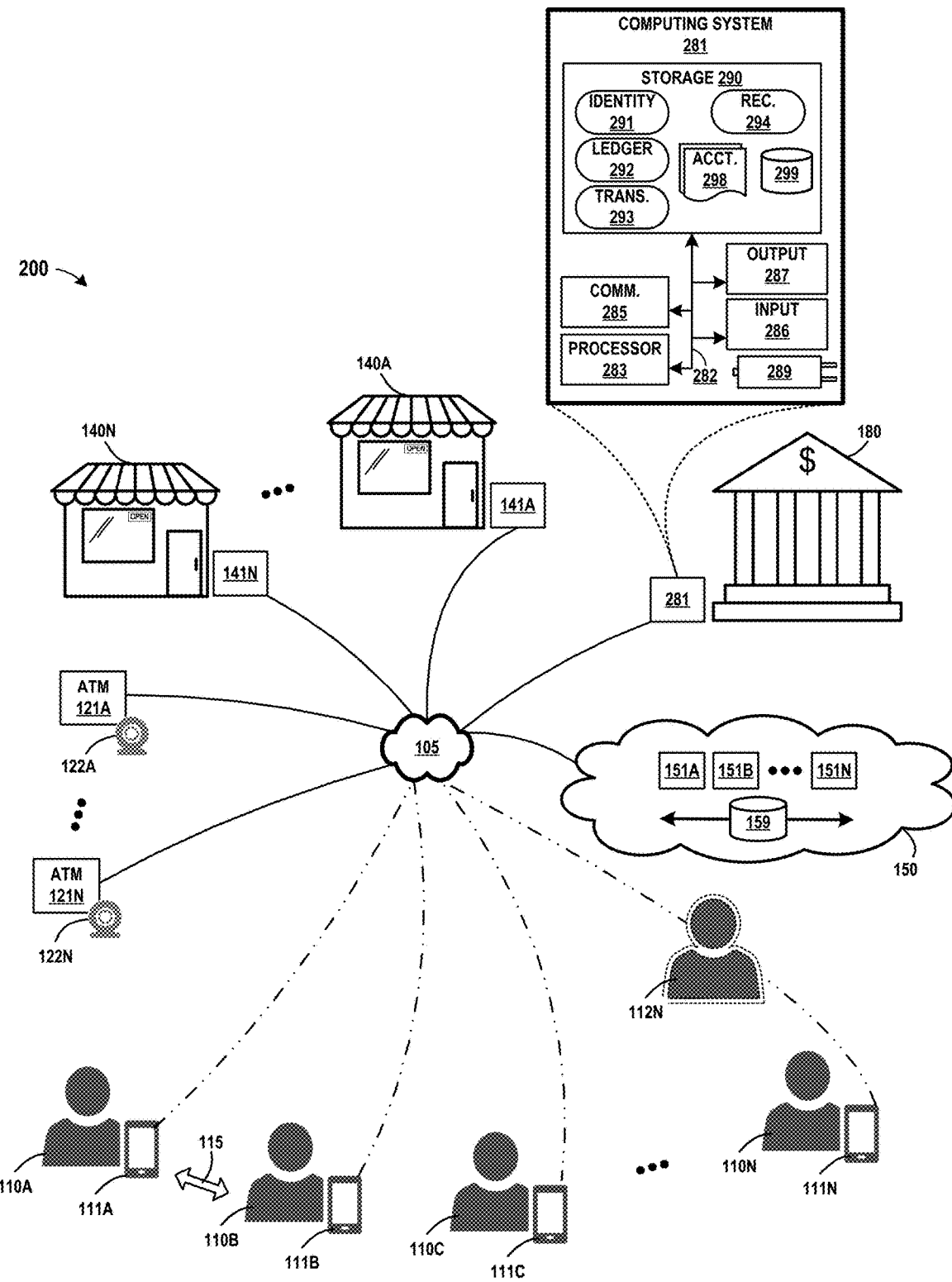
FIG. 2 is a conceptual diagram that includes a block diagram illustrating an example system that maintains and enhances network value by incentivizing certain user behaviors associated with the network, in accordance with one or more aspects of the present disclosure.

FIG. 2 is a conceptual diagram and block diagram illustrating an example system that maintains and enhances network value by incentivizing certain user behaviors associated with the network, in accordance with one or more aspects of the present disclosure. Transaction network 200 of FIG. 2 includes many of the same elements of transaction network 100 of FIG. 1, and in general, like-numbered elements illustrated in FIG. 2 correspond to elements similarly illustrated and numbered in FIG. 1.

FIG. 2 does, however, include computing system 281, illustrated as a block diagram with specific components and data modules. In examples described in connection with FIG. 2, computing system 281 may correspond to, or may be considered an example or alternative implementation of network management computing system 181 of FIG. 1. For ease of illustration, computing system 281 is depicted in FIG. 2 as a single computing system. However, in other examples, computing system 281 may comprise multiple devices or systems, such as systems distributed across a data center or multiple data centers. For example, separate computing systems may implement functionality performed by each of identity module 291, ledger module 292, transaction module 293, and recommendation module 294. Alternatively, or in addition, computing system 281 (or various modules illustrated in FIG. 2 as included within computing system 281) may be implemented through distributed virtualized compute instances (e.g., virtual machines, containers) of a data center, cloud computing system, server farm, and/or server cluster.

In FIG. 2, computing system 281 is illustrated as including underlying physical hardware that includes power source 289, one or more processors 283, one or more communication units 285, one or more input devices 286, one or more output devices 287, and one or more storage devices 290. Storage devices 290 may include user identity module 291, ledger module 292, transaction module 293, and recommendation module 294. One or more of the devices, modules, storage areas, or other components of computing system 281 may be interconnected to enable inter-component communications (physically, communicatively, and/or operatively). In some examples, such connectivity may be provided by through communication channels, which may include a system bus (e.g., communication channel 282), a network connection, an inter-process communication data structure, or any other method for communicating data.

Power source 289 of computing system 281 may provide power to one or more components of computing system 281. One or more processors 283 of computing system 281 may implement functionality and/or execute instructions associated with computing system 281 or associated with one or more modules illustrated herein and/or described below.

One or more processors 283 may be, may be part of, and/or may include processing circuitry that performs operations in accordance with one or more aspects of the present disclosure. One or more communication units 285 of computing system 281 may communicate with devices external to computing system 281 by transmitting and/or receiving data, and may operate, in some respects, as both an input device and an output device. In some or all cases, communication unit 285 may communicate with other devices or computing systems over network 105 or over other networks.

One or more input devices 286 may represent any input devices of computing system 281 not otherwise separately described herein, and one or more output devices 287 may represent any output devices of computing system 281 not otherwise separately described herein. Input devices 286 and/or output devices 287 may generate, receive, and/or process output from any type of device capable of outputting information to a human or machine. For example, one or more input devices 286 may generate, receive, and/or process input in the form of electrical, physical, audio, image, and/or visual input (e.g., peripheral device, keyboard, microphone, camera). Correspondingly, one or more output devices 287 may generate, receive, and/or process output in the form of electrical and/or physical output (e.g., peripheral device, actuator).

One or more storage devices 290 within computing system 281 may store information for processing during operation of computing system 281. Storage devices 290 may store program instructions and/or data associated with one or more of the modules described in accordance with one or more aspects of this disclosure. One or more processors 283 and one or more storage devices 290 may provide an operating environment or platform for such modules, which may be implemented as software, but may in some examples include any combination of hardware, firmware, and software. One or more processors 283 may execute instructions and one or more storage devices 290 may store instructions and/or data of one or more modules. The combination of processors 283 and storage devices 290 may retrieve, store, and/or execute the instructions and/or data of one or more applications, modules, or software. Processors 283 and/or storage devices 290 may also be operably coupled to one or more other software and/or hardware components, including, but not limited to, one or more of the components of computing system 281 and/or one or more devices or systems illustrated or described as being connected to computing system 281.

Data store 289 of computing system 281 may represent any suitable data structure or storage medium for storing information relating to accounts maintained for users 110, biometric and other information associated with users 110, information about transactions taking place on transaction network 200, and other information pertaining to the administration of transaction network 200 of FIG. 2 or aspects of transaction network 200. The information stored in data store 289 may be searchable and/or categorized such that one or more modules within computing system 281 may provide an input requesting information from data store 289, and in response to the input, receive information stored within data store 289. Data store 289 may be primarily maintained by identity module 291.

User identity module 291 may perform functions relating collecting information received from any of computing devices 111 pursuant to a self-disclosure process and/or verifying any information received for the purpose of identifying a user (e.g., from any of merchants 140 for a proposed transaction). Ledger module 292 may perform functions relating to interacting with or monitoring consensus network 150 or any other consensus network included within or used by transaction network 200. Transaction module 293 may perform functions relating processing any of transactions taking place on transaction network 200, such as transactions between any of users 110 and any of merchants 140 or between any number of users 110. Recommendation module 294 may perform functions relating to analyzing historical transactions (e.g., stored in data store 299) and generating recommendations for any of users 110 for a proposed transaction. In some examples, recommendation module 294 may apply a machine learning model and/or neural network to make predictions as to recommendations that have a high likelihood of being acted upon by one or more users 110.

Modules illustrated in FIG. 2 (e.g., user identity module 291, ledger module 292, transaction module 293, recommendation module 294) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
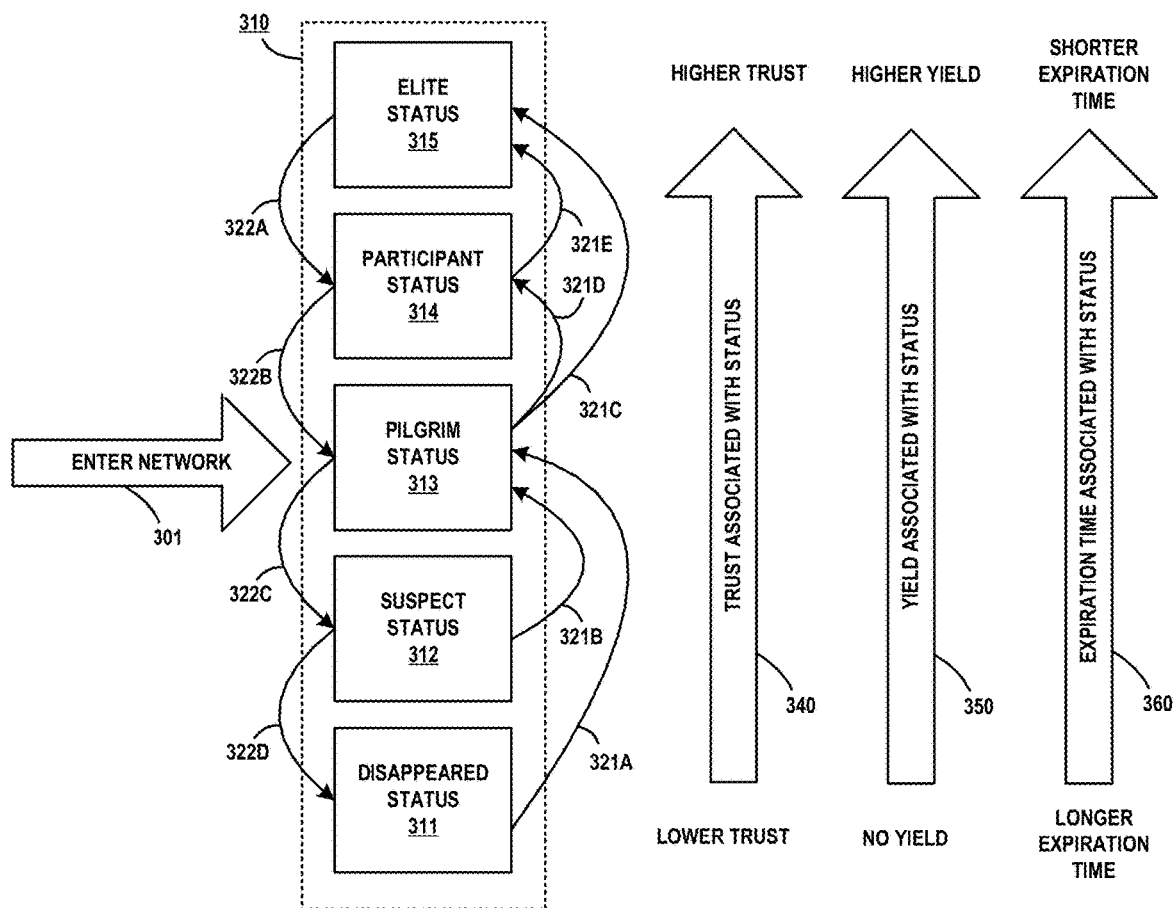
FIG. 3 is a conceptual diagram illustrating a transition matrix that includes a number of user states, in accordance with one or more aspects of the present disclosure.

FIG. 3 is a conceptual diagram illustrating a transition matrix that includes a number of user states, in accordance with one or more aspects of the present disclosure. User states 310, as described herein, may include a number of discrete states. As illustrated in FIG. 3, such states could include elite user status 315, participant user status 314, pilgrim user status 313, suspect user status 312, and disappeared user status 311.

Elite user status 315 is considered the "highest" state in the example illustrated, in the sense that users 110 classified as elite user status 315 are associated with higher trust than other states. Identity confidence (e.g., confidence that the user can be accurately identified) and confidence of completion (e.g., the tendency for a user to follow-through on promises) for users having elite user status 315 will tend to be higher than users in other states. In addition, users having elite user status 315 may be entitled to a higher benefit yield than users in other user states 310.

Disappeared user status 311 is the "lowest" state in FIG. 3, in the sense that users 110 classified as disappeared user status 311 have accumulated little or no trust. Typically, a user interacting with another user classified in disappeared user status 311 is likely to have little or no identity confidence (e.g., little or no confidence in the user's identity) when dealing with the other user, and is likely to have little or no confidence of completion (e.g., little or no confidence that the other user will complete a transaction) when dealing with the other user.

The other states, suspect user status 312, pilgrim user status 313, and participant user status 314, are along a trust continuum 340 illustrated in FIG. 3, and have levels of trust falling between disappeared user status 311 and elite user status 315. Similarly, these other states may be entitled to benefit yields that fall along the yield continuum 350 illustrated in FIG. 3, which indicates that higher user states 310 tend to be entitled to higher benefit yields derived from the value of the network. For example, users in elite user status 315 may be entitled to 100% of an allocable share of yield offered to users 110 on transaction network 200. Users in other user states 310 may be entitled to less than 100% of the allocable share of yield. For instance, users classified in participant user status 314 may receive only 90%, users classified in pilgrim user status 313 may receive only 50%, and users classified in suspect user status 312 may receive only 10%. Users in disappeared user status 311 might receive none of the allocable share of yield.

Users may transition from various user states 310 to other user states 310 through positive state transitions 321 or negative state transitions 322. For example, a user in pilgrim user status 313 may transition to participant user status 314 through positive state transition 321D. That same user may eventually advance to elite user status 315 through positive state transition 321E. In some cases, a user may advance from pilgrim user status 313 directly to elite user status 315 over positive state transition 321C. Other positive state transitions 321 are possible as illustrated in FIG. 3.

Similarly, a user in elite user status 315 may transition down to participant user status 314 over negative state transition 322A. That same user may also later transition to pilgrim user status 313 over negative state transition 322B. A user having pilgrim user status 313 may eventually transition to disappeared user status 311 through negative state transition 322C followed by negative state transition 322D.

Each of states 311 through 315 also may fall along an expiration continuum 360, which in FIG. 3 is intended to represent a simplified algorithm specifying the frequency at which users in each state are expected to verify their identity in some way. For instance, a new user on the network may enter through entry path 301, and be initially classified in pilgrim user status 313. Users in pilgrim user status 313 may be expected to verify their identity at least once every 20 days. Such a verification process may include engaging in an identity disclosure activity or self-disclosed identity process (e.g., self-disclosed identity process 115, described in connection with FIG. 2). In some examples, such a process may require that user in a lower state can only be authenticated by another user in a higher user state 310. In other examples, a user in at least some states may engage in an identity disclosure activity to verify an identity by simply performing certain types of transactions on the network. Such transactions may involve making a verified purchase from one of merchants 140.

Users in higher user states 310 may be held to a verification higher standard, so users classified at elite user status 315 may be required to verify their identity very often, such as every three days or so. Users classified at participant user status 314 may be required to verify their identity less often, but still frequently, such as every ten days or so. Users classified as pilgrim user status 313 might be required to verify their identity every 20 days, whereas users classified as participant user status 314 might be required to verify their identity only every 30 days. A user that fails to verify an identity sufficiently often is at risk of being reclassified at a lower user state 310, which may result in lower yield benefits accruing to that user. Users at the lowest state (e.g., disappeared user status 311) might not have any verification frequency requirements, but such users also might not be entitled to any yield benefits from the network. In some examples, while users 110 having elite user status 315 may be required to verify often, long-tenured and established users 110 having elite user status 315 might not be subject to such frequent obligations.

In FIG. 3 is principally described herein in the context of transaction network 200 of FIG. 2, and aspects of FIG. 3 are described with reference to one or more components, modules, systems, or devices illustrated in FIG. 2. In other examples, however, at least some aspects of FIG. 3 might be described differently in contexts other than that of FIG. 2. Accordingly, any operations described herein with reference to FIG. 2 may, in such other examples, be performed by different components, modules, systems, and/or devices than described herein.

With reference to FIG. 3, and in accordance with one or more aspects of the present disclosure, computing system 281 may receive a request to join transaction network 200. For instance, in an example that can be described in the context of FIG. 2 and FIG. 3, computing device 111A detects input as a result of interactions with computing device 111A (e.g., by user 110A). Computing device 111A outputs signals over network 105. Communication unit 285 of computing system 281 detects signals over network 105 and outputs information about the signals to identity module 291 of computing system 281. Identity module 291 determines that the signals correspond to a request to join transaction network 200.

Computing system 281 may collect information from user 110A. For instance, continuing with the example being described in the context of FIG. 2 and FIG. 3, identity module 291 causes communication unit 285 of computing system 281 to further communicate with computing device 111A. As part of the communications, computing system 281 interacts with computing device 111A to collect information from user 110A, where such information may include documentation, background information, responses to challenge questions posed to user 110A (e.g., "what is the name of your childhood pet?"), password(s), and other information. In some examples, the information collected might roughly correspond to the types of information collected from user 110A when that user applies for a credit card, a state-issued identification, or passport. Identity module 291 may also direct computing system 281 to collect biometric information from user 110A through computing device 111A. Such biometric information may include a fingerprint, facial images (e.g., for facial recognition), an iris scan, a voice print, or any other biometric marker that may be used to identify or verify the identity of user 110A. Identity module 291 stores the collected information in data store 299, correlating it to user 110A within data store 299. In some cases, identity module 291 stores a hash of the information collected, which may include a hash of attributes of the biometric information collected.

Collecting information about user 110A may occur through a physical visit with an agent of network administrator 180. For example, where network administrator 180 is a commercial bank or financial institution, user 110A might physically visit a bank branch operated by network administrator 180. There, user 110A may interact with an agent or employee of network administrator 180 to collect information (e.g., using computing device 111A or another device).

In other examples, collecting information about user 110A may occur through physical interactions by user 110A with one or more of field systems 121. For example, one or more of field systems 121 may controlled or operated by network administrator 180 as a point of presence for network administrator 180 (e.g., a bank or financial institution). In such an example, user 110A may interact with any of field systems 121 to enable such field system 121 to collect information. Such interactions might (or might not) involve use of sensors 122 or might involve user 110A using computing device 111A to interact with a field system 121.

Computing system 281, acting on policy established by network administrator 180, may determine that user 110A qualifies to be a member of transaction network 200. For instance, continuing with the example being described in the context of FIG. 2 and FIG. 3, identity module 291 analyzes the stored information collected from user 110A. Identity module 291 determines, based on the collected information, that data store 299 includes enough information about user 110A to enable identification of user 110A on transaction network 200 through responses to challenge questions, password(s), and/or biometric information (i.e., "brain/blood/heart" information about user 110A). Accordingly, identity module 291 determines, based on policy established by network administrator 180, that it is appropriate to confer membership status to user 110A on transaction network 200. Identity module 291 updates data store 299 with information consistent with establishing user 110A as a member of transaction network 200, initially setting user state 310 for user 110A to pilgrim user status 313 (i.e., entry path 301). Identity module 291 may also create one or more user accounts 298 for user 110A for use on transaction network 200 (or, alternatively, configures any existing user accounts 298 associated with user 110A for use on transaction network 200).

Computing system 281 may update consensus network 150 to reflect the status of user 110A as member of transaction network 200. For instance, still continuing with the example being described in the context of FIG. 2 and FIG. 3, identity module 291 outputs information about the status of user 110A to ledger module 292. Ledger module 292 causes communication unit 285 to output a series of signals over network 105. At least one of nodes 151 on consensus network 150 receives the signals and determines that the signals correspond to a request to update distributed ledger 159 maintained by consensus network 150. At least one of the nodes 151, such as node 151A, communicates with other nodes 151 on consensus network 150 pursuant to a consensus protocol. Node 151A causes (or initiate a process that causes) nodes 151 to reach consensus about proposed updates to distributed ledger 159. Eventually, nodes 151 within consensus network 150 update distributed ledger 159 to include information about user 110A, and thereby update distributed ledger 159 to reflect that user 110A is a member of transaction network 200, and that the initial status of user 110A is pilgrim user status 313.

Transaction network 200 may begin conferring membership benefits on user 110A. For instance, continuing with the example being described in the context of FIG. 2 and FIG. 3, computing system 281 may take actions to comply with an established obligation of network administrator 180 to confer benefits on each of users 110 who are members of transaction network 200. Such obligations may be based on incentive policies established by network administrator 180 to encourage membership in transaction network 200 and to encourage certain behaviors of member users 110 on transaction network 200. In some examples, such policies may involve an obligation, by network administrator 180, to distribute some form of compensation to each of users 110, where the amount of such compensation is based on the user state 310 associated with each user 110. For example, users 110 that have maintained elite user status 315 may receive a high amount (or the highest amount) of compensation. Users that have achieved participant user status 314, pilgrim user status 313, and suspect user status 312 may also receive some level of compensation, but in progressively lesser amounts, as indicated by yield continuum 350 in FIG. 3. Users 110 having a status corresponding to disappeared user status 311 might receive no compensation or membership benefits.

In some examples, actions taken by identity module 291 to comply with an obligation to confer benefits on each of users 110 may include distributing cash to member users 110. For instance, continuing with the example being described in the context of FIG. 2 and FIG. 3, identity module 291 assesses the user state 310 of each of users 110. Identity module 291 determines that user 110A is now a member of transaction network 200, and that user 110A is entitled to benefits of being a member of transaction network 200. Identity module 291 determines that based on user 110A being characterized as having pilgrim user status 313 and further based on policy established by network administrator 180, user 110A is entitled to some amount of cash yield. Identity module 291 causes transaction module 293 to transfer cash into user account 298 held by user 110A. Identity module 291 makes a similar determination for each of the other users 110 that are members of transaction network 200, and causes transaction module 293 to make corresponding cash distributions to user accounts 298 held by those other users 110. Transaction module 293 makes such cash distributions to user accounts 298 generally in a proportion with the user state 310 associated with each of users 110. Transaction module 293 may make such distributions to each of users 110 occasionally or periodically (e.g., weekly, monthly, or otherwise). Such periodic benefits may be adjusted each time to account for any changes in user state 310 associated with any of users 110.

Although identity module 291 may involve distributing cash to users 110, other types of value may be distributed to users 110. For instance, in another example that can be described in the context of FIG. 2 and FIG. 3, actions taken by computing system 281 may involve allocating cryptocurrency to users 110 in proportion to their achieved user state 310 on transaction network 200, rather than distributing cash to user accounts 298. In such an example, ledger module 292 causes communication unit 285 to output a series of signals over network 105. Nodes 151 detect the signals over network 105 and determine that the signals include proposed changes to distributed ledger 159 to reflect an allocation and/or reallocation of a cryptocurrency maintained on distributed ledger 159. Nodes 151 reach consensus about the proposed changes, and update distributed ledger 159. In the example being described, the changes to distributed ledger 159 reflect an allocation of cryptocurrency amongst users 110, thereby providing a financial benefit to users 110 (i.e., to the extent that such cryptocurrency is recognized as having value).

Network administrator 180 may establish policy that encourages or requires each of users 110 maintain their identity on transaction network 200, and to ensure that identity module 291 has access to up-to-date and accurate information that can be used to identify each user 110. To encourage such identity maintenance, network administrator 180 may establish a policy that enables users 110 to increase their user state 310 on transaction network 200 through regular identity maintenance or identity disclosure activities. Such a policy may also result in a reduction of user state 310 for those users that do not maintain their identity.

To implement such a policy, network administrator 180 may encourage or require each of users 110 to occasionally or periodically engage in a mutual self-disclosure process in which two users 110 disclose information to each other and each user verifies the other's identity. For instance, in one example, user 110A may be motivated to maintain or increase his or her user state 310 on transaction network 200. Based on such motivation, user 110A identifies another user 110, such as user 110B, who is known to already be a member of transaction network 200. User 110A approaches user 110B and proposes that they engage in a process in which both user 110A and user 110B disclose and verify each other's identity ("self-disclosed identity process 115" in FIG. 2). If user 110B agrees, user 110A and user 110B interact for the purpose of verifying each other's identity on transaction network 200. In some cases, the self-disclosed identity process 115 involves interactions by users 110 using their respective computing devices 111. For a self-disclosed identity process 115 involving user 110A and user 110B, computing device 111A and computing device 111B may be used.

For example, to verify user 110A, user 110A may place his or her thumb on a sensor that is part of computing device 111B (i.e., the computing device normally operated by user 110B), or computing device 111B may capture a voiceprint derived from speech uttered by user 110A, or computing device 111B may capture a picture or vide of user 110A. User 110A and user 110B may engage in a conversation or otherwise interact to enable user 110B to verify that the person user 110B is communicating and/or interacting with is actually user 110A (for users 110 that know each other well, this might not take long). Computing device 111B detects input that it determines corresponds to a verification, by user 110B, that the person he or she is interacting with is user 110A and that the collected information (e.g., thumbprint, voiceprint, picture, video, other biometric information) is from user 110A. In most cases, the self-disclosure requires user 110B to verify that the person he or she is interacting with is an identified person known to user 110B, and specifically in the example being described, is user 110A.

Computing system 281 may confirm that user 110A has been reverified. For instance, continuing with the example, computing device 111B outputs a signal over network 105. Communication unit 285 of computing system 281 detects a signal over network 105 and outputs information about the signal to identity module 291. Identity module 291 determines that the signal includes information about user 110A collected by computing device 111B and verified by user 110B. Identity module 291 compares the information to other information about user 110A stored in power source 289 and verifies that it matches or is consistent with previously-stored information about user 110A. For example, identity module 291 may evaluate the biometric information about user 110A detected by computing device 111B and verify that it is consistent with previously-collected biometric information about user 110A.

Computing system 281 may update consensus network 150 based on self-disclosed identity process 115. For instance, again with reference to the example being described in the context of FIG. 2 and FIG. 3, identity module 291 outputs information to ledger module 292, indicating that new information about user 110A has been received. Ledger module 292 causes communication unit 285 to output a signal over network 105. Nodes 151 detect the signal over network 105 and determine that the signal correspond to proposed new data to be added to distributed ledger 159, reflecting identity information associated with user 110A (e.g., biometric information or other information derived from the self-disclosure). Nodes 151 reach consensus about the proposed changes, and update distributed ledger 159 with the new identity information about user 110A.

A similar process may take place at the same time to verify user 110B. For example, to verify user 110B, user 110B may place his or her thumb on a sensor that is part of computing device 111A (i.e., the computing device normally operated by user 110A), or computing device 111A may capture a voiceprint derived from speech uttered by user 110B, or computing device 111A may capture a picture or video of user 110B. User 110A verifies that the other person is 110B, and computing device 111A detects input that it determines corresponds to a verification, by user 110A, that the person he or she is interacting with is user 110B. Computing device 111B outputs signals over 105 to enable identity module 291 of computing system 281 to verify that the collected information matches previously-stored information (e.g., biometric information) about user 110B. Ledger module 292 of computing system 281 may also communicate with consensus network 150 and cause consensus network 150 to update distributed ledger 159 to reflect the identity information associated with user 110B collected through self-disclosed identity process 115 involving user 110A and user 110B.

In some examples, self-disclosed identity process 115 between two users 110 might not just be based on the quantity of interactions, but also on the quality or nature of interactions (some might be more trustworthy than others). For example, if user 110B has a higher user state 310 than user 110A, then the verification of user 110A performed by user 110B in self-disclosed identity process 115 might be considered more authoritative or reliable than the verification of user 110B performed by user 110A. Similarly, identity verifications performed by an agent of network administrator 180 might be considered more authoritative than others.

Computing system 281 may receive information about a proposed transaction taking place on transaction network 200. For instance, in an example that can be described in the context of FIG. 2 and FIG. 3, computing device 111A detects input (e.g., from user 110A) and outputs a signal over network 105. Merchant computing system 141A detects signals over network 105 and determines that the signals correspond to a request to purchase an item offered for sale by merchant 140A. Merchant computing system 141N outputs signals over network 105. Communication unit 285 of computing system 281 detects signals over network 105 and outputs information about the signals to transaction module 293. Transaction module 293 determines that the signals correspond to a proposed transaction taking place between user 110A and merchant 140A.

Computing system 281 may process the transaction. For instance, continuing with the example, transaction module 293 determines that user 110A is a member of transaction network 200. Transaction module 293 interacts with computing system 281 to confirm the identity of user 110A using information about the identity of user 110A stored in power source 289. In some cases, confirming the identity of user 110A may involve further communications between computing system 281 and merchant computing system 141A (and/or further communications over network 105 between computing system 281 and computing device 111A). Transaction module 293 also identifies one or more payment methods available to user 110A (e.g., funds available in user account 298 or ownership of a cryptocurrency maintained by consensus network 150). Transaction module 293 transfers funds (or other value) from user 110A to merchant 140N as compensation for the sale of the item to user 110A. Transaction module 293 performs accounting operations associated with the transfer of value. Transaction module 293 causes communication unit 285 to output further signals over network 105. Merchant computing system 141A detects the signals and determines that the signals indicate that payment has been made by user 110A.

Transaction network 200 may charge a fee for the transaction. For instance, again continuing with the example being described, transaction module 293 determines, based on policy established by network administrator 180, that the transaction in which user 110A purchased an item from merchant 140A is subject to a transaction fee. Transaction module 293 causes such a transaction fee to be incurred by merchant 140N and user 110 (e.g., collectively, or in a preestablished proportion, or in a manner negotiated by merchant 140N and user 110A). In some cases, the transaction fee may be on the order of one-half of a percent of the value of the transaction. The ownership of the transaction fee may be designated by ownership of a cryptocurrency built into the digital payment network. Administrator 180 might own one-third of this Promise-to-Pay cryptocurrency that represents the future transaction fees charged on the digital payment network and may compensate a digital payment network administrator for clearing the transaction (e.g., as a credit card transaction). Another part of the transaction fee may be earmarked for distribution to users 110 who are members of transaction network 200 through their ownership of this Promise-to-Pay Transaction Fee cryptocurrency. In some cases, the fee for the digital payment network might be significantly lower than prevailing rates for credit card transactions, because when the fee earmarked for distribution to members of transaction network 200 is accounted for by a finite and divisible cryptocurrency that cannot be double-spent, both the administrator 180 and users 110 benefit. It is estimated that the assumption of the future disbursement of transaction fees coupled with current transaction fee disbursement will create an economic environment where both the administrator 180 and the members of transaction network 200 benefit at an increasing rate with time given this Promise-to-Pay cryptocurrency is a finite economic Giffen good. In some instances, this scheme enables the yield produced from the transaction fee to be used as an incentive to direct how users 110 can secure the network with their distributed actions of disclosure.

Further information relating to automated escrow contracts, which may be used in the context of examples described or mentioned herein, are available in U.S. Provisional Patent Application No. 63/256,495, filed Oct. 15, 2021 (entitled "COMMODITY DELIVERY CONTRACT WITH AUTOMATED ESCROW CONTRACT), and U.S. patent application Ser. No. 17/827,387, filed May 27, 2022 (and entitled "COMMODITY DELIVERY CONTRACT WITH AUTOMATED ESCROW CONTRACT"). The entire content of both of these applications is hereby incorporated by reference.

Computing system 281 may recommend transactions that could be performed by users 110. For instance, with reference to the previously-described example in which user 110A purchased an item from merchant 140A, transaction module 293 outputs information about the transaction to recommendation module 294. Recommendation module 294 uses the information about the transaction, along with information about other transactions performed by user 110A, to make a recommendation. Preferably, information collected by computing system 281 (and stored in data store 299) about transactions taking place on transaction network 200 for each of users 110 include detailed information about not only which merchant 140 is involved in the purchase, but also, detailed information sufficient to identify a category or basket associated with the transaction. For instance, transaction information might include information indicating that firewood was purchased at a gas station, or that a specific type of cereal was purchased at a grocery store, or that airline tickets for a flight to San Francisco were purchased. In some examples, transaction module 293 of computing system 281 collects such detailed information about purchases taking place on transaction network 200, correlates the information with each of users 110, and stores the correlated data in data store 299. Thereafter, recommendation module 294 of computing system 281 accesses the correlated information and uses it to generate recommendations about additional purchases that may be of interest to specific users 110. In some cases, the recommendations might propose that user 110A make an additional purchase from merchant 140A or from another merchant 140. The recommendations might propose that a different user 110 make a purchase from merchant 140A or another merchant 140. In other cases, the recommendations might suggest that one or more users 110 interact with other specific users 110 to obtain a service, obtain information, purchase a product, or to perform a service, task, or other action.

If sufficient information about users' interests, transaction history, and buying tendencies is known, recommendation module 294 may be able to identify recommendations that are relevant, pertinent, and align with the interests of users 110. In such examples, recommendations made by recommendation module 294 are more likely to be acted upon by users 110. As a result, network administrator 180 may generate revenue by making recommendations (e.g., on behalf of one or more merchants 140) for a fee. In some cases, network administrator 180 may charge a recommendation fee merely to make such recommendations. In another examples, network administrator 180 may charge a fee only when actually delivering (e.g., to a merchant 140) a user that acted on a recommendation and is now seeking to purchase an item from the merchant 140 (e.g., generally corresponding to pay-per-click models used in advertising campaigns on the internet).

In general, techniques described herein may be applicable to any computing network, but might be more appropriate for a network that is or acts as a public service or quasi-public service, especially to the extent that such networks may have a wider adoption. Networks with wider adoption may enable a wider view of transactions taking place on the network and more effective recommendation targeting.

As described herein, various computing systems (e.g., computing system 281) devices may analyze transactions and other information associated with each of users 110 in the process of making recommendations, as described above. It may be appropriate for such a computing device (i.e., network management computing system 181) to analyze such information only after receiving permission from the user. For example, in some examples described in this specification, before a computing device can collect or make use of information associated with a user, that user may be provided with an opportunity to control whether the computing device can collect or make use of information about the user (e.g., information about the input detected by a computing device, such as audio, images, or geolocation information detected by the computing device), or to dictate whether and/or how the computing device can use such information. In some examples, certain data may be modified so that personally-identifiable information is removed. In other examples, a user's geographic location may be generalized where location information is obtained (such as to a city, ZIP code, or state level), so that a location of a user cannot be determined.

Computing system 281 may eventually determine, based on activities by transaction network 100A on transaction network 200, that user state 310 associated with user 110A should be increased. For instance, identity module 291 occasionally, periodically, or continually reviews information about transactions, self-disclosed identity processes 115, and other behaviors and actions taken by users 110 on transaction network 200. Identity module 291 determines, based on such information, changes to user state 310 for one or more of users 110. In one example, identity module 291 may reevaluate user state 310 associated with user 110A. As described above, user 110A entered transaction network 200 in pilgrim user status 313, and later engaged in self-disclosed identity process 115 with user 110B. Identity module 291 determines, based on these and other actions taken by user 110A (e.g., a purchase made at merchant 140A, self-disclosed identity process 115 involving user 110B), that the user state 310 associated with user 110A should be increased to participant user status 314.

Computing system 281 may make changes to reflect the status change. For instance, with reference to FIG. 2 and FIG. 3, and based on the determination that the status of user 110A should be increased, identity module 291 stores information reflecting the status change in data store 299. Identity module 291 updates configuration settings for user account 298 associated with user 110A. Identity module 291 outputs information about the status change to ledger module 292. Ledger module 292 causes communication unit 285 to output a signal over network 105 to consensus network 150. Nodes 151 on consensus network 150 detect the signal and determine that the signal corresponds to a proposed change to distributed ledger 159, increasing user state 310 associated with user 110A to participant user status 314 from pilgrim user status 313 (i.e., positive state transition 321D).

Nodes 151 eventually reach consensus about the proposed status change, and update distributed ledger 159 to reflect that user 110A has achieved participant user status 314 on transaction network 200.

Computing system 281 may adjust benefits based on the increased user state 310 associated with user 110A. For instance, identity module 291 outputs information about the status change to transaction module 293. Transaction module 293 makes adjustments to data within data store 299 to reflect that as a result of a positive state transition 321D, user 110A may be entitled to increased yield, benefits, and/or compensation on transaction network 200. Accordingly, yield distributions for user 110A occurring after positive state transition 321D may include increased benefits and/or compensation.

If user 110A continues interacting with other users 110, performing transactions on transaction network 200, and engaging in regular self-disclosed identity processes 115, identity module 291 may eventually elevate user state 310 for user 110A to elite user status 315 (i.e., over positive state transition 321E). In doing so, identity module 291 may update user account 298 associated with user 110A to reflect user state 310 for user 110A as elite user status 315. Identity module 291 may also cause consensus network 150 to update distributed ledger 159 to reflect such a change in user state 310. Once user 110A has attained elite user status 315, user 110A may receive further enhanced or increased benefits from transaction network 200.

While user state 310 for some users 110 may increase over time, user state 310 may be reduced for other users 110. For instance, in an example that can be described with reference to FIG. 2 and FIG. 3, user 110C is assumed to be a new member of transaction network 200. Identity module 291 of computing system 281 accesses data store 299 and occasionally, periodically, or continually reviews stored information about transactions, self-disclosed identity processes 115, and other behaviors and actions taken by users 110 on transaction network 200. Over time, identity module 291 determines that user 110C has not interacted with other users 110 on transaction network 200 (e.g., no transactions by user 110C, no self-disclosed identity processes 115 involving user 110C, and no other interactions with other users 110). Based on this inactivity, identity module 291 reevaluates user state 310 associated with user 110C, and changes user state 310 for user 110C from the originally-assigned pilgrim user status 313 to suspect user status 312. Identity module 291 updates user account 298 associated with user 110C to reflect the downgraded status. Identity module 291 may also cause consensus network 150 to update distributed ledger 159 to reflect the downgraded status of user 110C. Thereafter, user 110C may still be entitled to benefits and/or financial incentives from transaction network 200, but such benefits may be lower as a member with suspect user status 312.

Other behaviors by may reduce the user state 310 associated with a user 110. For instance, continuing with the example about user 110C being described with reference to FIG. 2 and FIG. 3, merchant computing system 141A detects input that it determines corresponds to a request, from computing device 111C (operated by user 110C) to purchase an item from merchant 140A. Merchant computing system 141A interacts with computing device 111C to collect payment for the item being purchased. Merchant computing system 141A may also interact with computing system 281 to verify the identity of user 110C and to log information about the transaction. In the example being described, however, merchant computing system 141A receives biometric information about user 110C (from computing device 111C) that computing system 281 determines to be inconsistent with other biometric information stored in data store 299. Alternatively, or in addition, merchant computing system 141A causes the item to be delivered to user 110C, but payment for the item purchased from merchant 140A is slow or insufficient. In each case, identity module 291 of computing system 281 may evaluate the transaction between user 110C and merchant 140A. Identity module 291 may determine that the conduct of user 110C is cause for further reducing user state 310 associated with user 110C. In response, identity module 291 updates user account 298 associated with user 110C to downgrade user state 310 for user 110C, and causes consensus network 150 to update distributed ledger 159 to reflect the downgraded status of user 110C. Thereafter, user 110C may still be entitled to benefits and/or financial incentives from transaction network 200, but such benefits may be reduced after the incident with merchant 140A.

In some examples, identity module 291 may rely on a model trained to identify patterns of behavior suggesting fraudulent conduct or conduct that is otherwise an unproductive use of transaction network 100. For instance, identity module 291 might collect, over time, historical transaction information or information about historical network activity, and such historical information may be labeled to indicate whether it eventually resulted in fraud or other unproductive use of transaction network 100. The labeled data could be used to train a machine learning model to identity fraud and unproductive activities on transaction network 100. Identity module 291 may apply the model to real time activities on transaction network 100, and thereby predict whether such activities suggest fraud or other inappropriate conduct.

The user state 310 of user 110C may, in some examples, be rehabilitated to enable user 110C reattain pilgrim user status 313 or a higher user state 310, such as through regular self-disclosed identity processes 115 and incident-free transactions with merchants 140 on transaction network 200. However, if user 110C does not engage in such self-disclosed identity process 115 or transactions, identity module 291 of computing system 281 may eventually reclassify user 110C to disappeared user status 311 (e.g., over negative state transition 322D). Reclassification to disappeared user status 311 may eliminate all financial and other benefits to being a member of transaction network 200.

In some examples, one or more of users 110 may establish an artificial identity, which may serve as an extension of a user's identity. Such an artificial identity may enable a specific user 110 to operate on transaction network 200, but through an artificial identity, rather than that user's true identity. The artificial identity appears or operates on transaction network 200 as a separate identity, but normally, an artificial identity is not considered a member of transaction network 200 and receives no financial or other benefits from transaction network 200.

For example, FIG. 2 illustrates artificial identity 112N that operates as an extension of user 110N. An artificial identity may be useful if, for example, user 110N seeks to operate an online small business selling widgets (e.g., as an eBay merchant) but does not want to expose his or her real, personal identity in online sales operations. In such an example, other users 110 making purchases at the online store might not need to know the true identity of user 110N, so artificial identity 112N is the visible identity that is exposed by the online store. Artificial identity 112N is still tied to the actual identity of user 110N, and artificial identity 112N may have access to funds held by user 110N, so transactions completed by artificial identity 112N still accrue to the benefit or detriment of user 110N. Such transactions may affect the user state 310 associated with user 110N (whether positively or negatively). Accordingly, artificial identity 112N may mirror the user state 310 associated with user 110N, so that a purchaser can see, in a cryptographically obfuscated way, that artificial identity 112N is tied to a specific user 110 that has credibility (e.g., a high user state 310), is known to have a high rate of positive transaction completions or high ratings, and is otherwise considered trustworthy. Correspondingly, artificial identity 112N may build its own status through transactions at the online store, which may flow through to the identity of user 110N.

In some examples, any of users 110 may disable any existing artificial identities 112 associated with that user 110 and prevent creation of additional artificial identities 112. Since an artificial identity 112 may have access to funds, privileges, and other assets of user 110, and since activities conducted by artificial identity 112 may negatively affect the user state 310 of user 110, it may be appropriate to enable users 110 to limit creation or use of artificial identities 112. Such a capability may enable a user 110 to avoid concerns about fraudulent users 110 creating artificial identities 112 and, for example, removing funds from an account held by user 110.

Figure 4:
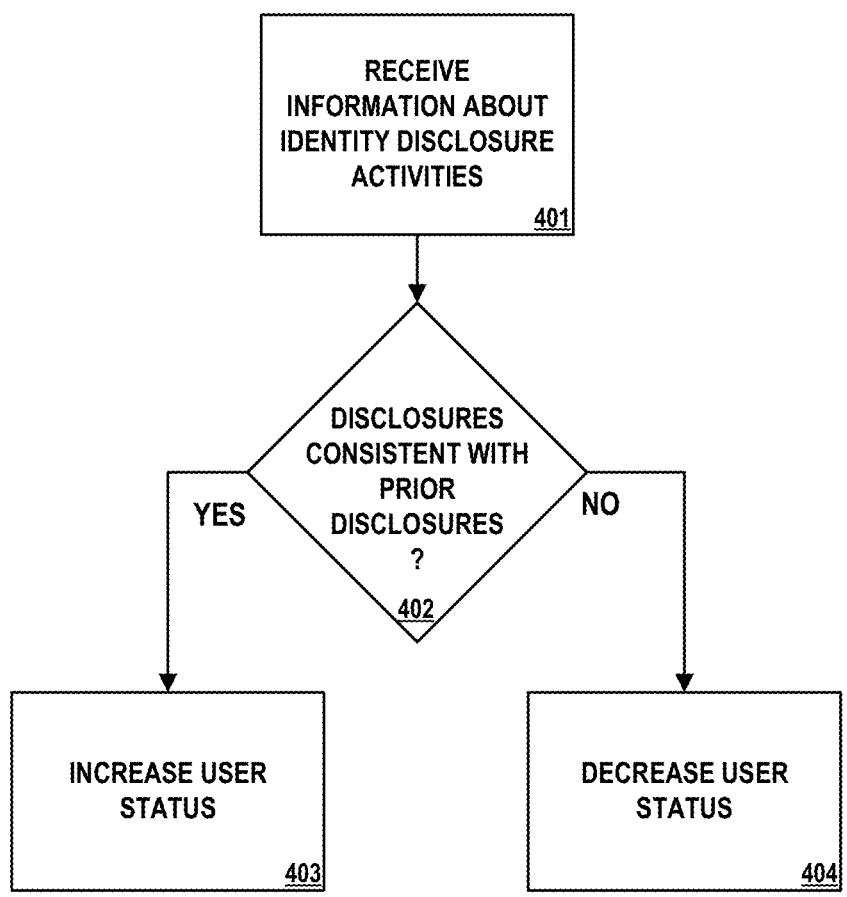
FIG. 4 is a flow diagram illustrating operations performed by an example computing system in accordance with one or more aspects of the present disclosure.

FIG. 4 is a flow diagram illustrating operations performed by an example computing system in accordance with one or more aspects of the present disclosure. FIG. 4 is described below within the context of network management computing system 181 of FIG. 1 and user states 310 of FIG. 3. In other examples, operations described in FIG. 4 may be performed by one or more other components, modules, systems, or devices, and in other contexts. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, network management computing system 181 may receive information about identity disclosure activities performed by each of a plurality of users on the network (401). For example, with reference to FIG. 1, network management computing system 181 detects signals over network 105 that it determines corresponds to information about self-disclosed identity process 115 performed between user 110A and user 110B.

Network management computing system 181 may determine whether the information about identity disclosure activities includes information consistent with a prior identity disclosure activity performed for either user 110A or user 110B. For example, network management computing system 181 may determine, with respect to user 110A, that biometric information included in the received information is consistent with prior biometric information received for user 110A (YES path from 402). Based on such a determination, network management computing system 181 may increase user state 310 associated with user 110A. Not all determinations that received biometric information is consistent with prior biometric information result in an increase in user state 310. However, in the example being described, and based on the determination that biometric information included in the received information is consistent with prior biometric information received for user 110A, network management computing system 181 increases user state 310 associated with user 110A (403). The change in user state 310 may correspond to a transition from pilgrim user status 313 to participant user status 314 (e.g., positive state transition 321D in FIG. 3).

Network management computing system 181 may determine whether the information about identity disclosure activities includes information that is not consistent with a prior identity disclosure activity performed for either user 110A or user 110B. For example, network management computing system 181 may also determine, with respect to user 110B, that biometric information included in the received information about self-disclosed identity process 115 is not consistent with prior biometric information received for user 110B (NO path from 402). In some examples, the inconsistency may suggest that user 110B is attempting to maintain two identities on transaction network 100. Based on such a determination, network management computing system 181 may decrease user state 310 associated with user 110B. Not all determinations that received biometric information is inconsistent with prior biometric information will result in a decrease in user state 310. However, in the example being described, network management computing system 181 decreases user state 310 associated with user 110B (404). The change in user state 310 for user 110B may correspond to a transition from pilgrim user status 313 to suspect user status 312 (e.g., negative state transition 322C in FIG. 3).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices (e.g., computing devices 111, field systems 121, merchant computing systems 141, nodes 151, network management computing system 181, and computing system 281, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising processing circuitry and a storage device, wherein the processing circuitry has access to the storage device and is configured to:

receive, over a network, information about an identity disclosure activity performed by a user that has a network status maintained by a distributed ledger, wherein the information includes biometric information identified as associated with the user, and wherein the network status confers a financial yield to the user;

evaluate the information about the identity disclosure activity to determine whether the biometric information is consistent with biometric information from a prior identity disclosure activity performed by the user;

determine, based on the evaluation of the information, an adjustment to the network status for the user; and output, based on the determined adjustment, a set of control signals to at least one node of a plurality of nodes that implement the distributed ledger, wherein the control signals cause the at least one node to modify the financial yield conferred to the user.

2. The system of claim 1, wherein to receive information about the identity disclosure activity, the processing circuitry is further configured to:

receive information derived from a self-disclosed identity process performed by the user and another user.

3. The system of claim 1, wherein to receive information about the identity disclosure activity, the processing circuitry is further configured to:

receive information based on a visit to a bank branch by the user.

4. The system of claim 1, wherein to receive information about the identity disclosure activity, the processing circuitry is further configured to:

receive information based on an interaction, by the user, with a field system.

5. The system of claim 1, wherein to output the set of control signals, the processing circuitry is further configured to:

output control signals that increase the network status of the user by increasing the financial yield conferred to the user.

6. The system of claim 1, wherein to output the set of control signals, the processing circuitry is further configured to:

output control signals that decrease the network status of the user by decreasing the financial yield conferred to the user.

7. The system of claim 1, wherein to evaluate the information about the identity disclosure activity, the processing circuitry is further configured to:

evaluate biometric data included within the information about the identity disclosure activity.

8. The system of claim 1, wherein the processing circuitry is further configured to:

modify, based on conduct of the user on the network, the network status of the user.

9. The system of claim 8, wherein to modify the network status of the user, the processing circuitry is further configured to:

decrease, based on conduct of the user on the network, the network status of the user.

10. The system of claim 1, wherein the processing circuitry is further configured to:

collect information about transactions performed on the network by the user;

generate, based on the collected information, a recommendation for the user; and collect, by an entity that controls the computing system, a recommendation fee.

11. A method comprising:

receiving, by a computing system and over a network, information about an identity disclosure activity performed by a user that has a network status maintained by a distributed ledger, wherein the information includes biometric information identified as associated with the user, and wherein the network status confers a financial yield to the user;

evaluating, by the computing system, the information about the identity disclosure activity to determine whether the biometric information is consistent with biometric information from a prior identity disclosure activity performed by the user;

determining, by the computing system and based on the evaluation of the information, an adjustment to the network status for the user; and outputting, by the computing system and based on the determined adjustment, a set of control signals to at least one node of a plurality of nodes that implement the distributed ledger, wherein the control signals cause the at least one node to modify the financial yield conferred to the user.

12. The method of claim 11, wherein receiving information about the identity disclosure activity includes:

receiving information derived from a self-disclosed identity process performed by the user and another user.

13. The method of claim 11, wherein receiving information about the identity disclosure activity includes:

receiving information based on a visit to a bank branch by the user.

14. The method of claim 11, wherein receiving information about the identity disclosure activity includes:

receiving information based on an interaction, by the user, with a field system.

15. The method of claim 11, wherein outputting the set of control signals includes:

outputting control signals that increase the network status of the user by increasing the financial yield conferred to the user.

16. The method of claim 11, wherein outputting the set of control signals includes:

outputting control signals that decrease the network status of the user by decreasing the financial yield conferred to the user.

17. The method of claim 11, wherein evaluating the information about the identity disclosure activity includes:

evaluating biometric data included within the information about the identity disclosure activity.

18. The method of claim 11, further comprising:

modifying, based on conduct of the user on the network, the network status of the user.

19. The method of claim 18, wherein modifying the network status of the user includes:

decreasing, based on conduct of the user on the network, the network status of the user.

20. Non-transitory computer-readable media comprising instructions that, when executed, configure processing circuitry of a computing system to:

receive, over a network, information about an identity disclosure activity performed by a user that has a network status maintained by a distributed ledger, wherein the information includes biometric information identified as associated with the user, and wherein the network status confers a financial yield to the user;

evaluate the information about the identity disclosure activity to determine whether the biometric information is consistent with biometric information from a prior identity disclosure activity performed by the user;

determine, based on the evaluation of the information, an adjustment to the network status for the user; and output, based on the determined adjustment, a set of control signals to at least one node of a plurality of nodes that implement the distributed ledger, wherein the control signals cause the at least one node to modify the financial yield conferred to of the user.

\* \* \* \* \*